United States Patent
Stenfort

(10) Patent No.: US 8,615,609 B2
(45) Date of Patent: Dec. 24, 2013

(54) SYSTEM, METHOD, AND COMPUTER PROGRAM PRODUCT FOR INSERTING A GAP IN INFORMATION SENT FROM A DRIVE TO A HOST DEVICE

(71) Applicant: LSI Corporation, San Jose, CA (US)

(72) Inventor: Ross John Stenfort, Los Altos, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/858,064

(22) Filed: Apr. 7, 2013

(65) Prior Publication Data

US 2013/0227174 A1 Aug. 29, 2013

Related U.S. Application Data

(63) Continuation of application No. 13/423,808, filed on Mar. 19, 2012, now Pat. No. 8,423,680, which is a continuation of application No. 12/505,333, filed on Jul. 17, 2009, now Pat. No. 8,140,712.

(51) Int. Cl.
*G06F 3/00* (2006.01)
*G06F 13/28* (2006.01)

(52) U.S. Cl.
USPC .................................. 710/5; 710/22; 710/25

(58) Field of Classification Search
None
See application file for complete search history.

(56) References Cited

U.S. PATENT DOCUMENTS

| | | | | |
|---|---|---|---|---|
| 5,924,120 A | * | 7/1999 | Razdan et al. | 711/141 |
| 6,085,248 A | * | 7/2000 | Sambamurthy et al. | 709/229 |
| 7,739,470 B1 | * | 6/2010 | Norgren | 711/168 |
| 7,827,320 B1 | * | 11/2010 | Stevens | 710/5 |

* cited by examiner

*Primary Examiner* — Ernest Unelus
*Assistant Examiner* — Ronald Modo
(74) *Attorney, Agent, or Firm* — Pantent Ventures: Bennett Smith; Korbin Van Dyke

(57) ABSTRACT

A system, method, and computer program product are provided for inserting a gap in information sent from a drive to a host device. In operation, one or more commands are received at a drive from a host device. Additionally, information is queued to send to the host device. Furthermore, a gap is inserted in the information to send to the host device such that the host device is capable of sending additional commands to the drive.

18 Claims, 4 Drawing Sheets

SYSTEM, METHOD, AND COMPUTER PROGRAM PRODUCT FOR INSERTING A GAP IN INFORMATION SENT FROM A DRIVE TO A HOST DEVICE

CROSS REFERENCE TO RELATED APPLICATIONS

This application is a continuation of U.S. patent application Ser. No. 13/423,808 filed Mar. 19, 2012) entitled SYSTEM, METHOD, AND COMPUTER PROGRAM PRODUCT FOR INSERTING A GAP IN INFORMATION SENT FROM A DRIVE TO A HOST DEVICE, now U.S. Pat. No. 8,423,680; which was a continuation of U.S. patent application Ser. No. 12/505,333 filed Jul. 17, 2009) entitled SYSTEM, METHOD, AND COMPUTER PROGRAM PRODUCT FOR INSERTING A GAP IN INFORMATION SENT FROM A DRIVE TO A HOST DEVICE, now U.S. Pat. No. 8,140,712; and wherein the foregoing applications are herein incorporated by reference for all purposes.

FIELD OF THE INVENTION

The present invention relates to memory systems, and more particularly to receiving commands at a drive from a host device once the drive started sending data.

BACKGROUND

In many storage systems, target devices have priority when transmitting frames over a host when there is a collision. In these cases, when queuing commands (e.g. using First Party Direct Memory Access, etc.), once the target has sent a direct memory access (DMA) setup frame information structure (FIS) to enter the data phase, the host can not typically send any commands to the target device.

If the drive is able to fetch data quickly, then the host could send a number of commands equal to the maximum queue depth to the drive. The drive may then return a DMA setup, data, a DMA setup, data, etc. without any breaks between the frames. This does not allow the host to send any more commands.

In these cases, the queue depth of the drive may oscillate from a maximum queue depth to zero, back to the maximum queue depth, and again to zero. This may negatively affect performance. There is thus a need for addressing these and/or other issues associated with the prior art.

SUMMARY

A system, method, and computer program product are provided for inserting a gap in information sent from a drive to a host device. In operation, one or more commands are received at a drive from a host device. Additionally, information is queued to send to the host device. Furthermore, a gap is inserted in the information to send to the host device such that the host device is capable of sending additional commands to the drive.

DETAILED DESCRIPTION

Figure 1:
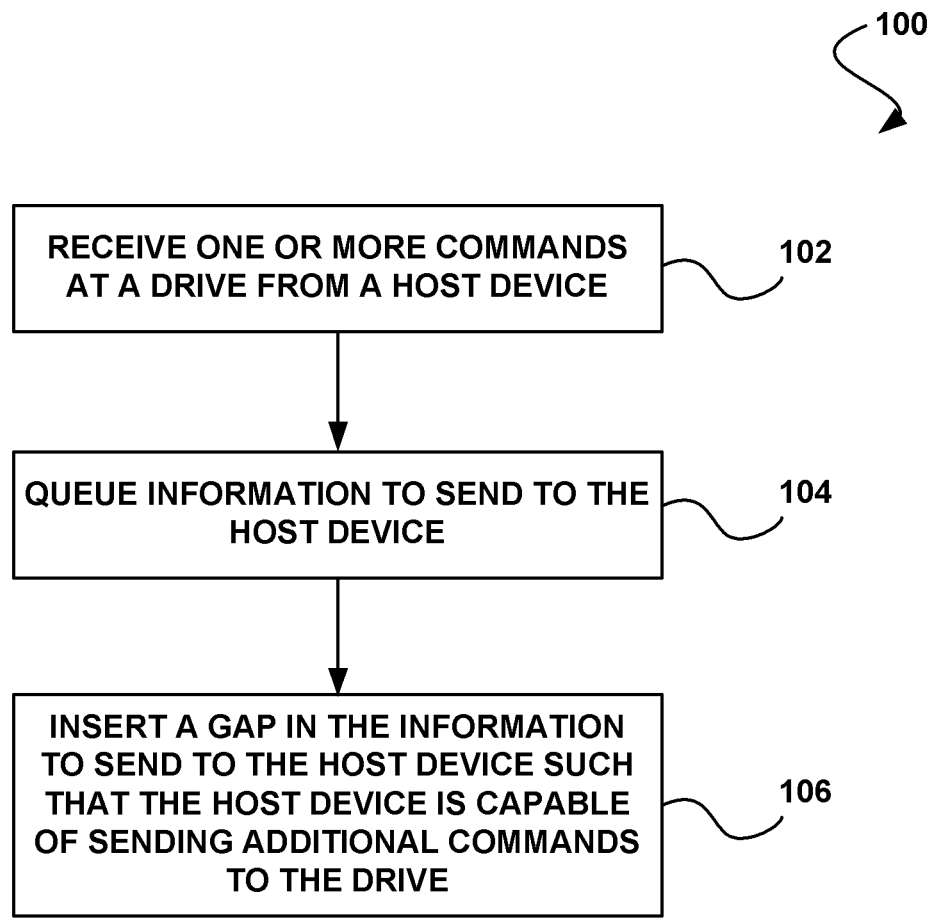
FIG. 1 shows a method for inserting a gap in information sent from a drive to a host device, in accordance with one embodiment.

FIG. 1 shows a method 100 for inserting a gap in information sent from a drive to a host device, in accordance with one embodiment. As shown, one or more commands are received at a drive from a host device. See operation 102.

The commands may include any command or instruction capable of being sent from the host device to the drive. For example, in one embodiment, the command may include a command to transfer data (e.g. a transfer request, etc.). In another embodiment, the command may include a command to access a portion of memory associated with the drive.

The drive may include any drive capable of storing data. For example, in one embodiment, the drive may include a Serial ATA (SATA) drive. In various other embodiments, the drive may include, but is not limited to, a Serial Attached SCSI (SAS) drive, a Fibre Channel (FC) drive, or a Universal Serial Bus (USB) drive, and/or any other storage device or drive.

Further, the host device may include any device capable of sending commands to the drive. For example, in various embodiments, the host device may include a desktop computer, a lap-top computer, and/or any other type of logic. Still yet, the host device may take the form of various other devices including, but not limited to, a personal digital assistant (PDA) device, a mobile phone device, etc.

As shown further in FIG. 1, information is queued to send to the host device. See operation 104. In one embodiment, the information may be queued in a buffer or a device capable of queuing data.

The information may include any data or information associated with the data (e.g. data type information, data structure information, etc.). In one embodiment, the information may include setup information and data associated with at least one of the commands. For example, the commands received at the drive from the host device may include a command to retrieve data.

The drive may then queue the data and setup information. In one embodiment, the setup information may include a direct memory access (DMA) frame information structure (FIS). In another embodiment, the setup information may include a set device bit FIS. It should be noted that, in various embodiments, the gap may be time based or command threshold based or a combination of both these things. The threshold may also be based on the number of commands and the queue depth or other parameters.

Furthermore, a gap is inserted in the information to send to the host device such that the host device is capable of sending additional commands to the drive. See operation 106. In the context of the present description, a gap refers to break, interruption, or delay where the host device is capable of sending commands to the drive.

In various embodiments, the gap may include a time delay, or additional information, etc. For example, in one embodiment, inserting the gap may include inserting a time delay. In another embodiment, inserting the gap may include inserting additional information.

The additional information may include any type of information. For example, in one embodiment, the additional information may include information indicating a length of the gap. In another embodiment, the additional information may include vender specific information. In yet another embodiment, the additional information may include information associated with the gap.

In still another embodiment, the information may include setup information including information indicating the time delay is following the setup information. In this case, the information may include status information and the time delay may be inserted before sending the status information or after the status information.

It should be noted that the gap may be inserted at any point when sending the information. For example, in the case that the gap includes a time delay, the time delay may be inserted before sending the setup information. In another embodiment, the time delay may be inserted after sending the setup information.

In either case, the additional commands may be received at the drive from the host device during a period of the time delay. In one embodiment, inserting the gap may include inserting the gap during a period when the information is being sent to the host device.

It should be noted that a point when the gap is inserted may be based on a variety of parameters. For example, in one embodiment, the gap may be inserted based on a current queue depth of the drive. In another embodiment, the gap may be inserted based on an amount of time since a previous command was received.

Furthermore, the length or size of gap may be based on a variety of parameters. For example, in one embodiment, a length of time of the time delay may be based on a current queue depth of the drive. In another embodiment, a length of time of the time delay may be based on an amount of time since a previous command was received.

In either case, as an option, at least one of a length of time of the time delay or a point when the time delay is inserted may be determined in real time. As another option, at least one of a length of time of the time delay or a point when the time delay is inserted may be a predetermined value. In this case, the predetermined value may be a value set in the hardware or the software.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
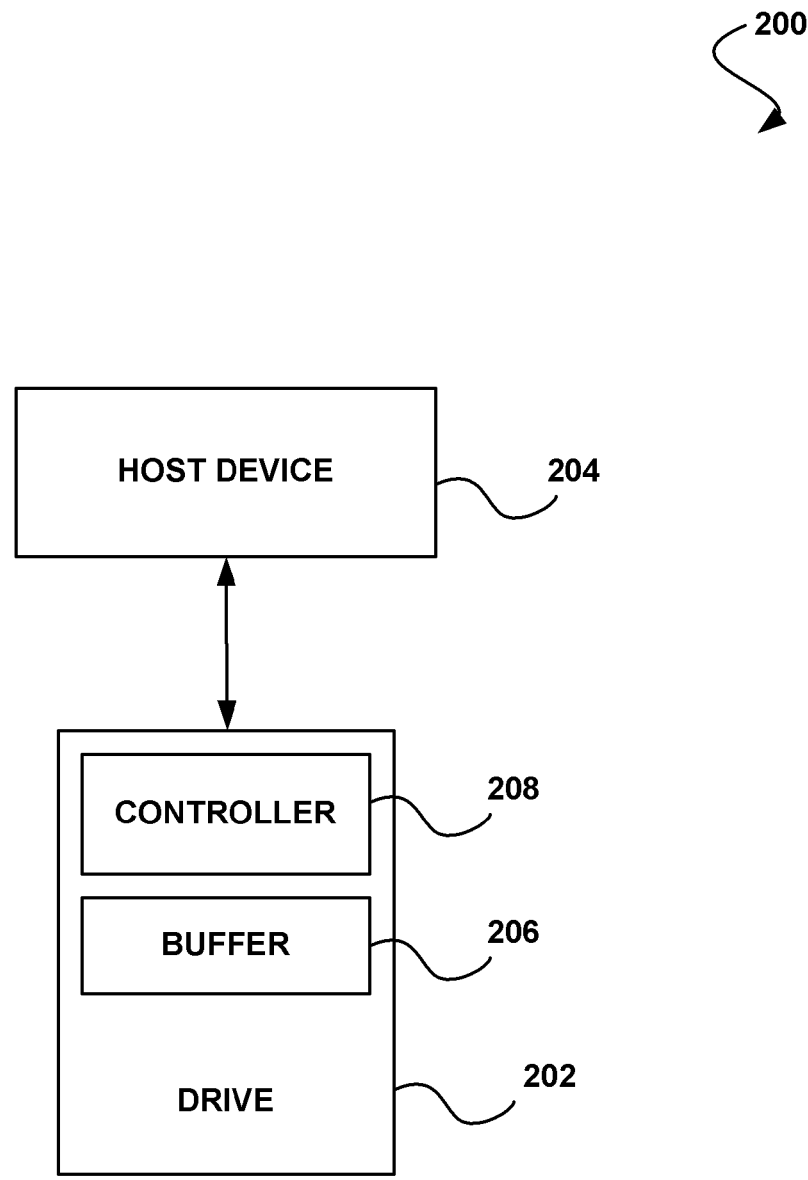
FIG. 2 shows a system for inserting a gap in information sent from a drive to a host device, in accordance with one embodiment.

FIG. 2 shows a system 200 for inserting a gap in information sent from a drive to a host device, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 includes a drive 202 for receiving one or more commands from a host device 204. Furthermore, the system 200 includes a buffer 206 for queuing information to send to the host device 204. Still yet, the system 200 includes a controller 208 for inserting a gap in the information to send to the host device 204 such that the host device 204 is capable of sending additional commands to the drive 202 after the drive 202 has initiated sending the information to the host device 204.

It should be noted that the drive 202 may include various types of drives such as a SATA drive, an SAS drive, an FC drive and/or any other storage device or drive. By inserting gaps in the information, drives that fetch data very quickly may be configured such that they do not oscillate from a maximum queue depth to zero when the drives have started sending data.

For examples, in SATA, the target generally has priority when transmitting frames over the host when there is a collision. Additionally, typically in SATA, when queuing commands (e.g. using First Party Direct Memory Access, etc.), once the target has sent a DMA setup FIS to enter the data phase, the host can not send any commands to the target.

If the drive can fetch data really quickly then a host could send a number of commands equal to a maximum queue depth (e.g. 32, etc.) to the drive. Typically, the drive may then return a DMA setup, data, a DMA setup, data, etc. with no gaps between the frames. This does not allow the host to send any more commands.

The queue depth of the drive will oscillate from the maximum queue depth (e.g. 32, etc.) to 0 and back to the maximum queue depth (e.g. 32, etc.) to 0. This may negatively affect performance. In some cases, hard disk drives (HDDs) are so slow that there are gaps in the data so this oscillation does not occur. However, with faster drives the oscillation may occur.

Thus, in one embodiment, one or more gaps may be inserted before sending a DMA setup out the host device 204 to allow the host device 204 to send more commands to the drive 202. The point when the gap is inserted may be based on a variety of parameters including a current queue depth of the drive 202 or the amount of time since the last command. In one embodiment, the point when the gap is inserted may be based on the current queue depth of the drive 202, the amount of time since the last command, or a combination of these or some other parameter.

Further, a length of the gap to allow commands to be sent from the host device 204 may also be based on a variety of parameters. For example, the length of the gap may be based on the queue depth, time, or some other parameter. In various embodiments, these parameters may be tuned in real time by either the host device 204 or the drive 202. As an option, the parameters may also be set to fixed values.

In one embodiment, the drive 202 may signal the host device 204 by adding information to the DMA setup to indicate there will be a gap after this DMA setup. As an option, the host device 204 may signal the end of sending commands by adding information into the command. It should also be noted that, in one embodiment, the gaps may also be inserted before sending status. This may be performed instead of inserting the gaps before the DMA setup FIS, or in addition to inserting the gaps before the DMA setup FIS.

Figure 3:
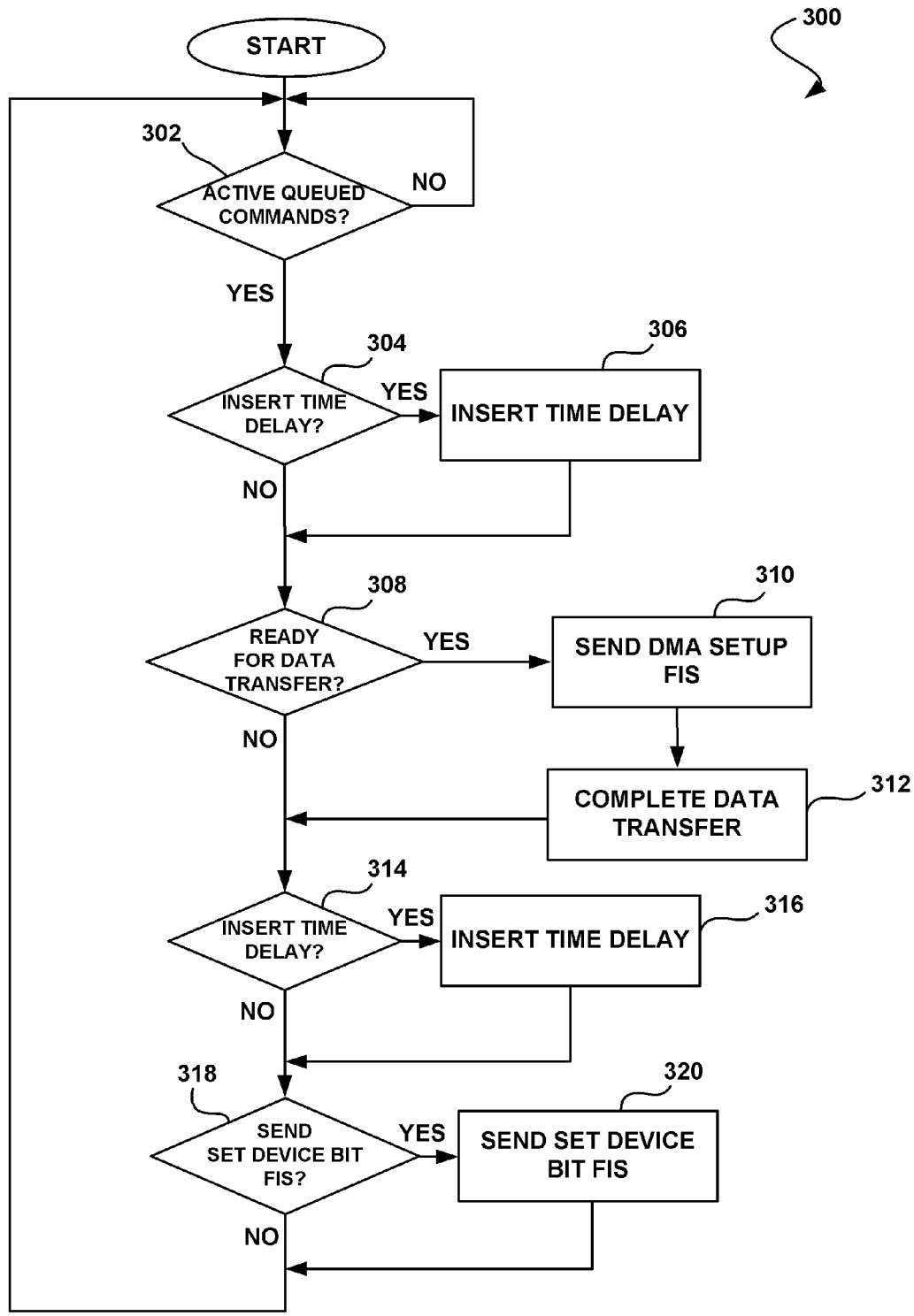
FIG. 3 shows a method for inserting a gap in information sent from a drive to a host device, in accordance with another embodiment.

FIG. 3 shows a method 300 for inserting a gap in information sent from a drive to a host device, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, it is determined whether active queued commands are present. See operation 302. In this case, the active queued commands may be active queued commands in a buffer associated with a drive.

If active queued commands are present, it is determined whether to insert a time delay. See operation 304. In one embodiment, a timer may be used to insert the time delay.

If it is determined to insert the time delay, the time delay is inserted. See operation 306. It is then determined whether the system is ready for data transfer. See operation 308.

If the system is ready for data transfer, a DMA setup FIS is sent. See operation 310. Once the DMA setup FIS is sent, the data transfer is completed. See operation 312. It should be noted that the DMA setup may be for only a piece of data associated with a command. Once this piece of data has completed transferring, then a gap may be inserted.

Thus, it is then again determined whether to insert a time delay. See operation 314. If it is determined to insert the time delay, the time delay is inserted. See operation 316.

As shown further, it is determined whether to send a set device bit FIS. See operation 318. If it is determined to send the set device bit FIS, the set device bit FIS is sent. See operation 320.

In this way, the host device is capable of sending commands to the drive, even when the drive has started sending data. It should be noted that, although not illustrated in FIG. 3, information may be sent to the host device during the period of the time delay. For example, information regarding the duration of the time delay or vender specific information may be inserted.

Figure 4:
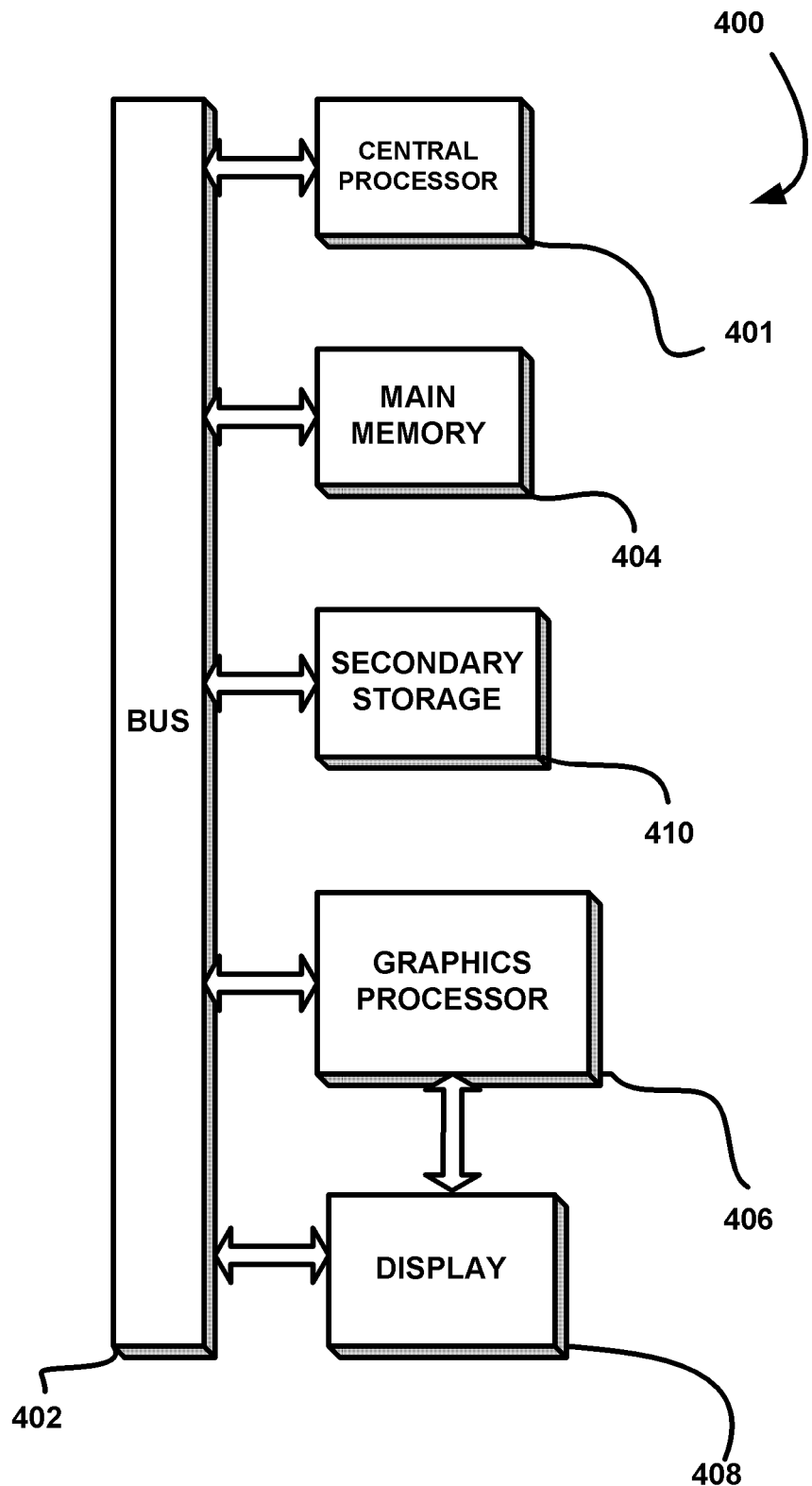
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, 1 comprising:
    receiving one or more commands at a drive from a host device, the host device enabled to communicate with the drive using a storage protocol that allows the drive to prevent the host device from sending additional commands;
    queuing information to send to the host device, wherein the information comprises setup information and the setup information comprises a Direct Memory Access (DMA) setup;
    determining whether to insert a time delay; and
    based on the determining, conditionally inserting the time delay to enable the host device to send the additional commands to the drive, wherein the inserting the time delay is before sending the DMA setup.

2. The method of claim 1, further comprising examining whether some of the received commands are actively queued in a buffer associated with the drive; and wherein the determining is conditional based on results of the examining.

3. The method of claim 1, wherein the information comprises one or more of
    data information,
    data structure information,
    Direct Memory Access (DMA) Frame Information Structure (FIS), set device bit FIS, and
    data associated with at least one of the received commands.

4. The method of claim 1, wherein the determining is based at least in part on a current command queue depth of the drive.

5. The method of claim 1, wherein the determining is based at least in part on an amount of time since a previous one of the received commands was received.

6. The method of claim 1, further comprising determining 1 in real time a length of the time delay.

7. A system, comprising:
    means for receiving one or more commands at a drive from a host device, the host device enabled to communicate with the drive using a storage protocol that allows the drive to prevent the host device from sending additional commands;
    means for queuing information to send to the host device, wherein the information comprises setup information and the setup information comprises a Direct Memory Access (DMA) setup;
    means for determining whether to insert a time delay; and
    means for conditionally inserting, based on the means for determining, the time delay to enable the host device to send the additional commands to the drive, wherein the inserting the time delay is before sending the DMA setup.

8. The system of claim 7, further comprising means for examining whether some of the received commands are actively queued in a buffer associated with the drive; and wherein the means for determining is conditional based at least in part on results of the means for examining.

9. The system of claim 7, wherein the information comprises one or more
of
data information,
data structure information,
Direct Memory Access (DMA) Frame Information Structure (FIS), set device bit FIS, and
data associated with at least one of the received commands.

10. The system of claim 7, wherein the means for determining operates based at least in part on a current command queue depth of the drive.

11. The system of claim 7, wherein the means 1 for determining operates based at least in part on an amount of time since a previous one of the received commands was received.

12. The system of claim 7, further comprising means for determining in real time a length of the time delay.

13. A non-transitory computer readable medium having a set of instructions stored therein which when executed by a computer causes the computer to perform functions comprising:
receiving one or more commands at a drive from a host device, the host device enabled to communicate with the drive using a storage protocol that allows the drive to prevent the host device from sending additional commands;
queuing information to send to the host device, wherein the information comprises setup information and the setup information comprises a Direct Memory Access (DMA) setup; and
conditionally inserting a time delay to enable the host device to send the additional commands to the drive, wherein the inserting the time delay is before sending the DMA setup.

14. The non-transitory computer readable medium of claim 13, wherein the functions further comprise examining whether some of the received commands are actively queued in a buffer associated with the drive, and determining whether to insert the time delay based at least in part on results of the examining.

15. The non-transitory computer readable medium of claim 13, wherein the functions further comprise determining whether to insert the time delay based at least in part on a current command queue depth of the drive.

16. The non-transitory computer readable medium of claim 13, wherein the functions further comprise determining whether to insert the time delay based at least in part on an amount of time since a previous one of the received commands was received.

17. The non-transitory computer readable medium 1 of claim 13, wherein the functions further comprise determining in real time an onset and length of the time delay.

18. The non-transitory computer readable medium of claim 13, wherein the information comprises one or more of data information,
data structure information,
Direct Memory Access (DMA) Frame Information Structure (FIS),
set device bit FIS, and
data associated with at least one of the commands.

* * * * *